US012771197B2

(12) United States Patent
Ishihara

(10) Patent No.: US 12,771,197 B2
(45) Date of Patent: Oct. 20, 2026

(54) STATOR HAVING WINDING WIRES WITH DIFFERING WIRE COATING THICKNESS

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Kanzo Ishihara, Osaka (JP)

(73) Assignees: NAMI RI WORKS TECHNOLOGIES, LTD., Yokkaichi (JP); SUMITOMO WIRING SYSTEMS, LTD., Yokkaichi (JP); SINTOMO ELECTRIC INDUSTRIES, LTD., Osaka (JP)

(*) Notice: Subject to any disclaimer, the term of this patent is extended or adjusted under 35 U.S.C. 154(b) by 184 days.

(21) Appl. No.: 18/722,350

(22) PCT Filed: Dec. 6, 2022

(86) PCT No.: PCT/JP2022/044814

§ 371 (c)(1),
(2) Date: Jun. 20, 2024

(87) PCT Pub. No.: WO2023/120148

PCT Pub. Date: Jun. 29, 2023

(65) Prior Publication Data

US 2024/0421647 A1 Dec. 19, 2024

(30) Foreign Application Priority Data

Dec. 24, 2021 (JP) ................................ 2021-210409

(51) Int. Cl.
*H02K 3/28* (2006.01)
*H02K 1/16* (2006.01)

(52) U.S. Cl.
CPC ................ *H02K 3/28* (2013.01); *H02K 1/16* (2013.01)

(58) Field of Classification Search
CPC .................................. H02K 3/28; H02K 1/16
See application file for complete search history.

(56) References Cited

U.S. PATENT DOCUMENTS

2017/0133968 A1 5/2017 Takahashi
2020/0328645 A1* 10/2020 Piispanen ............ H02K 1/2706
2021/0391116 A1* 12/2021 Weber ...................... H02K 3/34

FOREIGN PATENT DOCUMENTS

DE 102015218110 A1 3/2017
JP 2017-175852 A 9/2017

(Continued)

OTHER PUBLICATIONS

International Search Report, Application No. PCT/JP2022/044814, mailed Feb. 21, 2023. ISA/Japan Patent Office.

*Primary Examiner* — Viet P Nguyen
(74) *Attorney, Agent, or Firm* — Brooks Kushman, P.C.

(57) ABSTRACT

A stator includes a stator core and a coil. The coil includes at least a first winding wire and a second winding wire, and connection states of the first winding wire and the second winding wire are switched. The first winding wire includes a first insertion portion that passes through a slot. The second winding wire includes a second insertion portion that passes through the slot through which the first insertion portion passes. Both the first insertion portion and the second insertion portion are disposed in the same slot. The first insertion portion includes a first core wire and a first coating portion that covers the first core wire. The second insertion portion includes a second core wire and a second coating portion that covers the second core wire. A thickness of the second coating portion is smaller than a thickness of the first coating portion.

3 Claims, 6 Drawing Sheets

(56) References Cited

FOREIGN PATENT DOCUMENTS

| | | | | | |
|---|---|---|---|---|---|
| JP | 2020-120428 | A | | 8/2020 | |
| WO | WO-2020094406 | A1 | * | 5/2020 | ............... H02K 3/34 |
| WO | 2021-137544 | A1 | | 7/2021 | |

* cited by examiner

| | First Switching Unit | Second Switching Unit | Winding Wire to be Energized | State of Coil |
|---|---|---|---|---|
| First Switching State | Short-circuit state | Canceled state | Both winding wires | First energized state |
| Second Switching State | Canceled state | Short-circuit state | Second winding wire | Second energized state |
| Third Switching State | Canceled state | Canceled state | None | None-energized state |

FIG. 3

STATOR HAVING WINDING WIRES WITH DIFFERING WIRE COATING THICKNESS

CROSS-REFERENCE TO RELATED APPLICATIONS

This application is the U.S. national stage of PCT/JP2022/044814 filed on Dec. 6, 2022, which claims priority of Japanese Patent Application No. JP 2021-210409 filed on Dec. 24, 2021, the contents of which are incorporated herein.

TECHNICAL FIELD

The present disclosure relates to a stator.

BACKGROUND

JP 2017-175852A discloses a stator core that includes a plurality of slots, and stator winding wires wound around the stator core. The stator winding wires include multi-phase winding wires that include a first winding wire and a second winding wire. The first winding wire and the second winding wire are disposed in the same slot. The connection states of the first winding wire and the second winding wire of the stator winding wires are switched.

In JP 2017-175852A, amounts of heat that is generated on the first winding wire and the second winding wire whose connection states are switched are not taken into consideration.

The present disclosure provides a technique that makes it easy to reduce an amount of heat that is generated on a second winding wire out of first and second winding wires whose connection states are switched.

SUMMARY

A stator according to the present disclosure is a stator that includes a stator core and a coil. A connection state of the coil is switched. The stator core includes a plurality of slots and a plurality of tooth portions that are annularly aligned in an alternating manner. The coil includes winding wires of a plurality of phases, including at least a first winding wire and a second winding wire that are wound around the tooth portions, connection states of the first winding wire and the second winding wire being switched. The first winding wire includes a first insertion portion that passes through a slot. The second winding wire includes a second insertion portion that passes through the slot through which the first insertion portion passes. Both the first insertion portion and the second insertion portion are disposed in the same slot. The first insertion portion includes a first core wire and a first coating portion that covers the first core wire. The second insertion portion includes a second core wire and a second coating portion that covers the second core wire, and a thickness of the second coating portion is smaller than a thickness of the first coating portion.

Advantageous Effects

According to the present disclosure, it is easy to reduce an amount of heat that is generated on a second winding wire out of first and second winding wires whose connection states are switched.

BRIEF DESCRIPTION OF DRAWINGS

FIG. 3 is an explanatory diagram that depicts the correspondence relationship between states of switching units of a switching apparatus of an AC electric motor and winding wires to be energized, and the like.

DETAILED DESCRIPTION OF PREFERRED EMBODIMENTS

Figure 1:
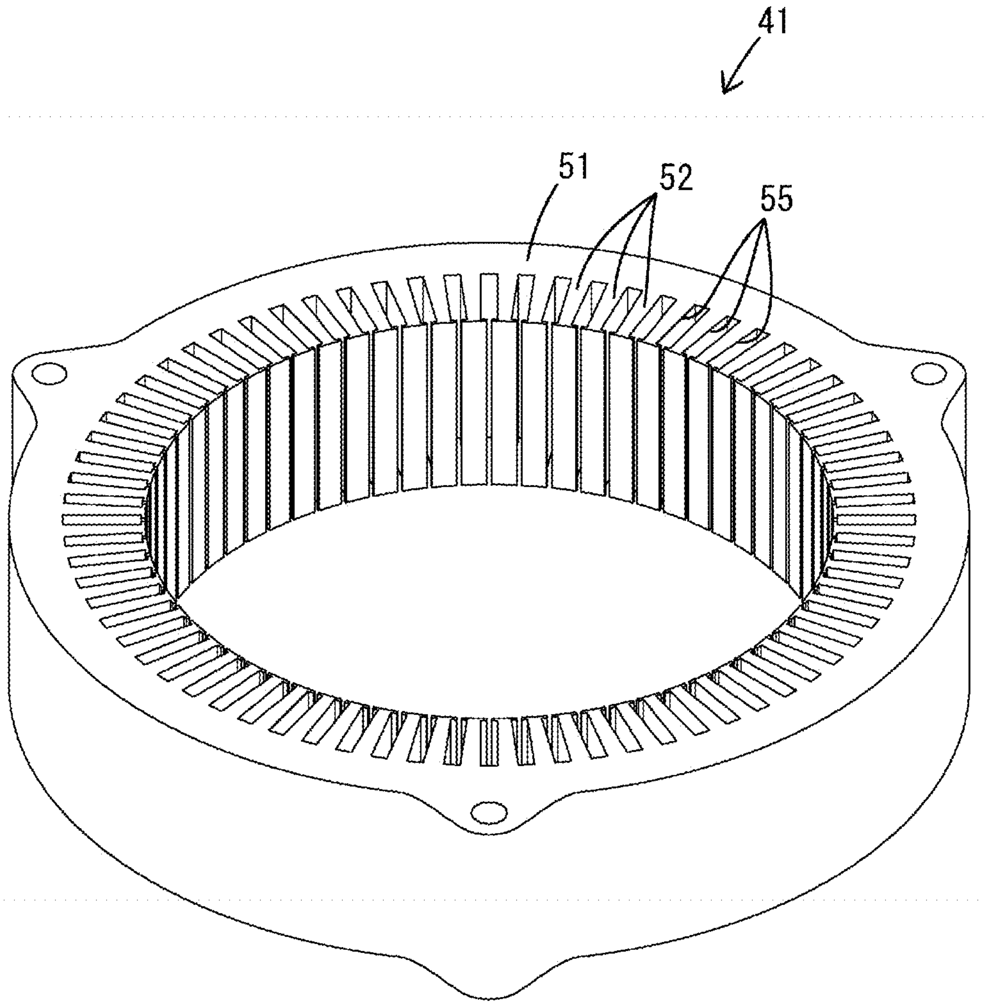
FIG. 1 is a perspective diagram of a stator core according to a first embodiment.

Hereinafter, embodiments of the present disclosure will be listed and described.

In a first aspect, a stator includes a stator core and a coil. A connection state of the coil is switched. The stator core includes a plurality of slots and a plurality of tooth portions that are annularly aligned in an alternating manner. The coil includes winding wires of a plurality of phases, including at least a first winding wire and a second winding wire that are wound around the tooth portions, connection states of the first winding wire and the second winding wire being switched. The first winding wire includes a first insertion portion that passes through a slot. The second winding wire includes a second insertion portion that passes through the slot through which the first insertion portion passes. Both the first insertion portion and the second insertion portion are disposed in the same slot. The first insertion portion includes a first core wire and a first coating portion that covers the first core wire, the second insertion portion includes a second core wire and a second coating portion that covers the second core wire, and a thickness of the second coating portion is smaller than a thickness of the first coating portion.

According to the above stator, the thickness of the second coating portion is smaller than the thickness of the first coating portion, and thus it is easy to reduce an amount of heat that is generated on the second winding wire.

In a second aspect, in the stator according to the first aspect, the first winding wires include a plurality of first insertion portions that pass through a slot, the second winding wires include a plurality of second insertion portions that pass through the slot through which the plurality of first insertion portions pass, and the first insertion portions and the second insertion portions are alternatingly aligned in a radial direction in the same slot.

According to the above stator, even when the thickness of the second coating portion is small, the thickness of the first coating portion adjacent to the second coating portion is large, and thus it is easy to ensure insulation between the first core wire and the second core wire while suppressing the thickness of the second coating portion.

In a third aspect, in the stator according to the first or the second aspect, a second cross-section area of the second core wire when cut in a plane direction orthogonal to an extending direction of the second core wire is larger than a first cross-section area of the first core wire when cut in a plane direction orthogonal to an extending direction of the first core wire.

Regarding the above stator, the second cross-section area of the second core wire is larger than the first cross-section area of the first core wire. For this reason, it is easy to reduce the electrical resistivity of the second core wire, and to reduce power loss (so called copper loss) and heat generation on the second core wire. Moreover, regarding the above stator, the thickness of the second coating portion is smaller than the thickness of the first coating portion, and thus, it is possible to suppress an increase in the cross-section area of the second insertion portion while increasing the second cross-section area of the second core wire.

In a fourth aspect, the stator according to any one of the first through the third aspects, the coil is switched between a first energized state where both the first winding wire and the second winding wire are energized and a second energized state where only the second winding wire is energized.

According to the above stator, it is easy to reduce an amount of heat that is generated on the coil in the second energized state, and thus it is easy to reduce a total amount of heat that is generated on the coil in the first energized state and the second energized state.

First Embodiment

Overview of Stator

Figure 2:
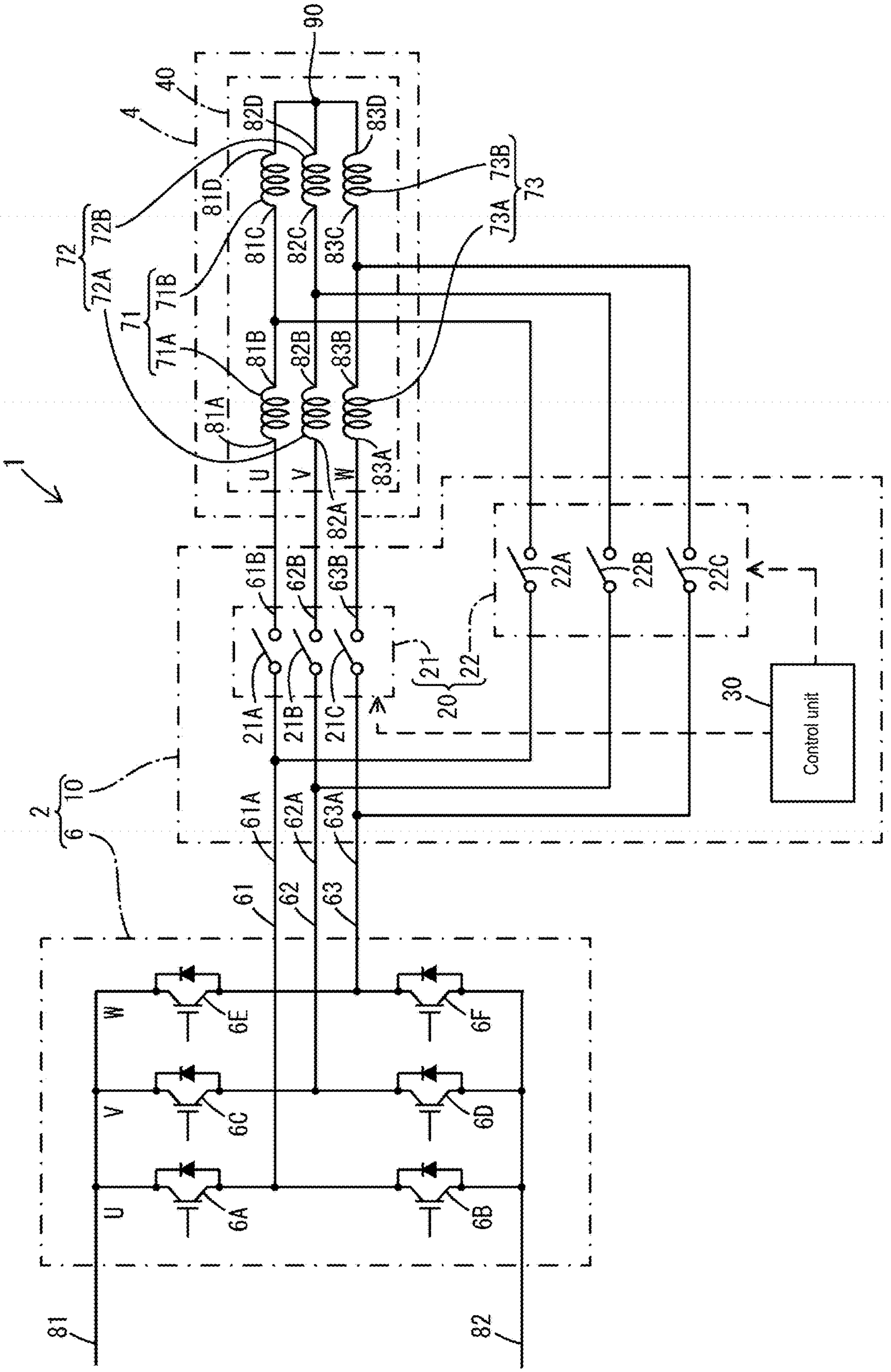
FIG. 2 is a circuit diagram schematically illustrating an onboard system that includes the stator according to the first embodiment.

A stator 40 according to a first embodiment is a component of a vehicle AC electric motor 4 (see FIG. 2). The AC electric motor 4 is a three-phase AC electric motor. The AC electric motor 4 is a three-phase drive motor for generating drive power for driving and rotating wheels provided on a vehicle, for example.

Figure 6:
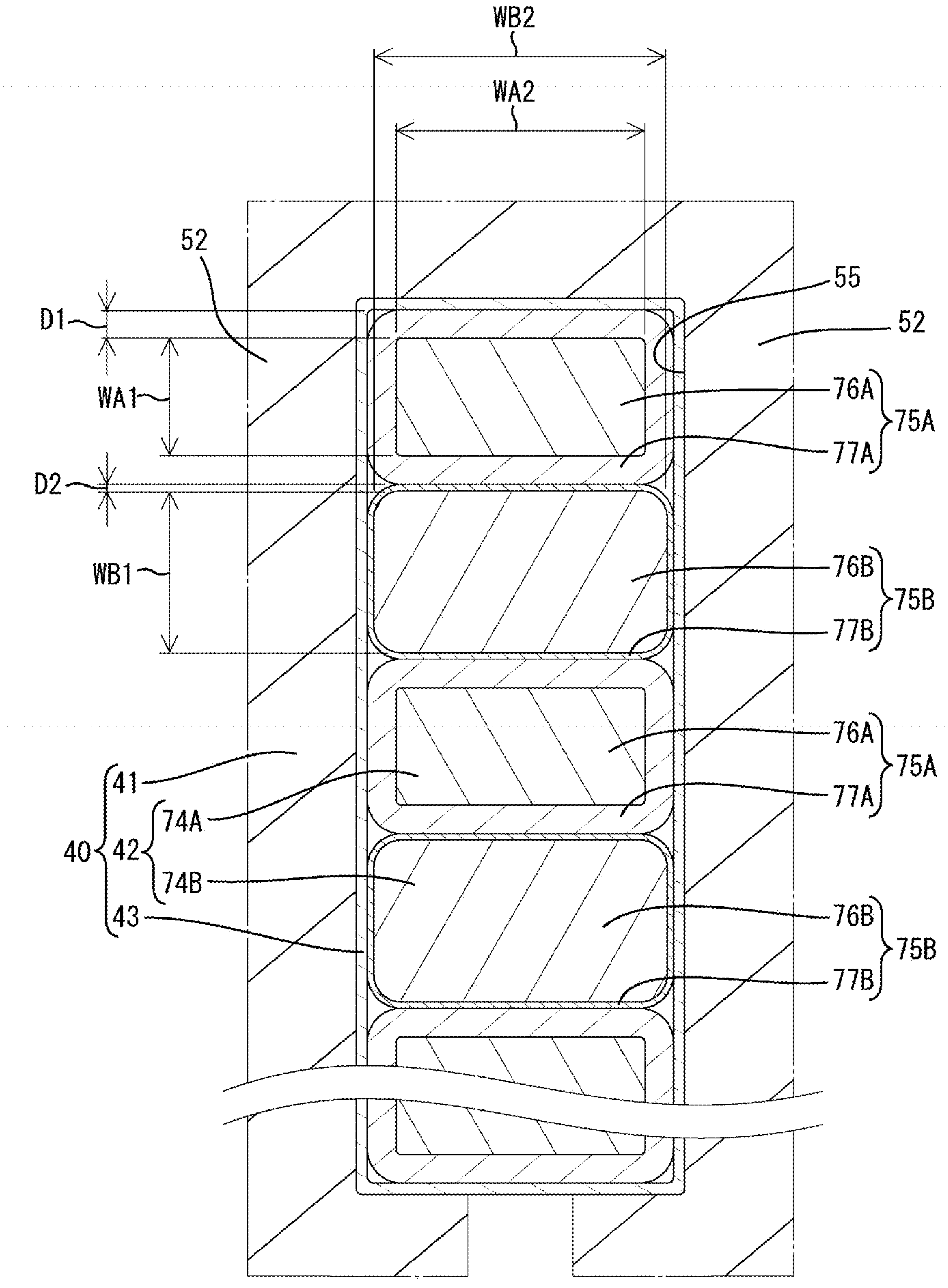
FIG. 6 is a cross-sectional view of the stator, showing a state where first insertion portions and second insertion portions are disposed in the same slot.

The stator 40 has an annular shape (specifically, a circular annulus). Hereinafter, the radial direction of the stator 40 is referred to as a "radial direction", the axial direction of the stator 40 is referred to as an "axial direction", and the circumferential direction of the stator 40 is referred to as a "circumferential direction". A rotor (not illustrated) is disposed inward of the inner circumferential surface of the stator 40 in the radial direction. As shown in FIG. 6, the stator 40 includes a stator core 41, a coil 42, and an insulative member 43.

As shown in FIG. 1, the stator core 41 includes a yoke portion 51 and tooth portions 52. The yoke portion 51 has an annular shape (specifically, a circular annulus). A plurality of tooth portions 52 are provided. The tooth portions 52 are annularly aligned along the inner circumferential surface of the yoke portion 51. The tooth portions 52 are disposed spaced apart from each other in the circumferential direction. The tooth portions 52 protrude from the inner circumferential surface of the yoke portion 51 inward in the radial direction (on the side on which the rotor is disposed in the radial direction). The tooth portions 52 are each shaped as a wall extending along the radial direction and the axial direction.

As shown in FIG. 1, each slot 55 is formed by two adjacent tooth portions 52. The slot 55 passes through the stator core 41 in the axial direction. The slot 55 is open in the two surfaces in the axial direction of the stator core 41 and in the inner circumferential surface in the radial direction of the stator core 41. A plurality of slots 55 are provided. The slots 55 are annularly aligned.

The coil 42 passes through the slots 55, and is wound around the tooth portions 52.

The insulative member 43 is an insulative sheet, for example. As shown in FIG. 6, the insulative member 43 is disposed in a slot 55, and surrounds the outer periphery of the coil 42 that passes through the slot 55. The insulative member 43 insulates the coil 42 from the stator core 41.

As shown in FIG. 2, the coil 42 includes winding wires 71, 72, and 73 of a plurality of phases (specifically, three phases). The winding wires 71, 72, and 73 are wound around the tooth portions 52 (see FIG. 1). The winding wire 71 is also referred to as a "U-phase winding wire 71". The winding wire 72 is also referred to as a "V-phase winding wire 72". The winding wire 73 is also referred to as a "W-phase winding wire 73". The coil 42 is a so-called Y-connected three-phase coil. The U-phase (first phase) winding wire 71, the V-phase (second phase) winding wire 72, and the W-phase (third phase) winding wire 73 may be connected at a short-circuit portion 90 that may serve as a neutral point.

Winding wires of each phase among the winding wires 71, 72, and 73 of the plurality of phases include a first winding wire 71A and a second winding wire 71B, and, for each phase, the first winding wire 71A and the second winding wire 71B are connected in series. The U-phase (first phase) winding wire 71 includes the first winding wire 71A and the second winding wire 71B, and the first winding wire 71A and the second winding wire 71B are connected in series. The V-phase (second phase) winding wire 72 includes a first winding wire 72A and a second winding wire 72B, and the first winding wire 72A and the second winding wire 72B are connected in series. The W-phase (third phase) winding wire 73 includes a first winding wire 73A and a second winding wire 73B, and the first winding wire 73A and the second winding wire 73B are connected in series.

In this manner, the coil 42 includes winding wires of the plurality of phases (specifically, three phases), each including the first winding wire 71A and the second winding wire 71B that are wound around the tooth portions 52. The connection states of the first winding wire 71A and the second winding wire 71B of the coil 42 are switched. The following description is directed to a case where, when the coil 42 is applied to an onboard system 1 shown in FIG. 2, the connection state is switched.

Overview of Onboard System

The onboard system 1 is a system that is mounted in a vehicle. The onboard system 1 includes the above AC electric motor 4 and an electric motor drive apparatus 2.

The electric motor drive apparatus 2 is an apparatus that drives the AC electric motor 4 based on electric power supplied from a pair of power paths 81 and 82. The pair of power paths 81 and 82 are conductive paths on which DC power that is based on power from a battery (not illustrated, and, for example a high-voltage battery) is transmitted. The power path 81 is a power path on the high potential side. The power path 82 is a power path on the low potential side. A DC voltage, which is a fixed voltage, may be applied between the pair of power paths 81 and 82, for example.

The electric motor drive apparatus 2 is also an apparatus that controls operations of the AC electric motor 4. The electric motor drive apparatus 2 includes an inverter 6, three conductive paths (a U-phase conductive path 61, a V-phase conductive path 62, and a W-phase conductive path 63), and a switching apparatus 10.

The inverter 6 is an inverter circuit that outputs three-phase (U-phase, V-phase, and W-phase) AC power. Three-phase AC power output from the inverter 6 is supplied to the AC electric motor 4 via the three conductive paths (the U-phase conductive path 61, the V-phase conductive path 62, and the W-phase conductive path 63), and is used to rotate and drive the AC electric motor 4. The inverter 6 includes switching elements 6A, 6C, and 6E that function as upper arm elements and switching elements 6B, 6D, and 6F that function as lower arm elements. The switching elements 6A, 6B, 6C, 6D, 6E, and 6F are each constituted by an insulated-gate bipolar transistor (IGBT) and a reflux diode, for example.

The inverter 6 repeats an on operation and an off operation by the switching elements 6A, 6B, 6C, 6D, 6E, and 6F receiving an on/off signal (for example, a PWM (pulse width modulation) signal), for example, and generates three-phase AC power. On/off control of the switching elements 6A, 6B, 6C, 6D, 6E, and 6F is performed by, for example, an electronic control apparatus (not illustrated) (e.g., an onboard ECU (Electronic Control Unit), etc.). A method for controlling the inverter 6 by the electronic control apparatus is a three-phase modulation method that uses a PWM signal, for example. Note that the method for controlling the inverter 6 by the electronic control apparatus may be any method that makes it possible to drive the AC electric motor 4, and various methods such as known V/f control and known vector control may be adopted.

A pair of U-phase switches of the inverter 6 is composed of the switching element 6A that is an upper arm element and the switching element 6B that is a lower arm element. A pair of V-phase switches is composed of the switching element 6C that is an upper arm element and the switching element 6D that is a lower arm element. A pair of W-phase switches is composed of the switching element 6E that is an upper arm element and the switching element 6F that is a lower arm element.

The U-phase conductive path 61 is a conductive path between the U-phase winding wire 71 and the switching elements 6A and 6B. The U-phase conductive path 61 includes a conductive path 61A and a conductive path 61B. The conductive path 61A is a conductive path between a switch 21A and the switching elements 6A and 6B. One end of the conductive path 61A is electrically connected to a conductive path between the switching elements 6A and 6B. The other end of the conductive path 61A is electrically connected to one end of the switch 21A. The conductive path 61B is electrically connected to the other end of the switch 21A and an end portion 81A that is one end of the U-phase winding wire 71. When the switch 21A is in an on state, the switching elements 6A and 6B and the U-phase winding wire 71 can be short-circuited and electrically connected to each other.

The V-phase conductive path 62 is a conductive path between the V-phase winding wire 72 and the switching elements 6C and 6D. The V-phase conductive path 62 includes a conductive path 62A and a conductive path 62B. The conductive path 62A is a conductive path between a switch 21B and the switching elements 6C and 6D. One end of the conductive path 62A is electrically connected to a conductive path between the switching elements 6C and 6D. The other end of the conductive path 62A is electrically connected to one end of the switch 21B. The conductive path 62B is electrically connected to the other end of the switch 21B and an end portion 82A that is one end of the V-phase winding wire 72. When the switch 21B is in an on state, the switching elements 6C and 6D and the V-phase winding wire 72 can be short-circuited and electrically connected to each other.

The W-phase conductive path 63 is a conductive path between the W-phase winding wire 73 and the switching elements 6E and 6F. The W-phase conductive path 63 includes a conductive path 63A and a conductive path 63B. The conductive path 63A is a conductive path between a switch 21C and the switching elements 6E and 6F. One end of the conductive path 63A is electrically connected to a conductive path between the switching elements 6E and 6F. The other end of the conductive path 63A is electrically connected to one end of the switch 21C. The conductive path 63B is electrically connected to the other end of the switch 21C and an end portion 83A that is one end of the W-phase winding wire 73. When the switch 21C is in an on state, the switching elements 6E and 6F and the W-phase winding wire 73 can be short-circuited and electrically connected to each other.

In the coil 42, an end portion 81B is the other end of the first winding wire 71A. The end portion 81B is electrically connected to an end portion 81C that is one end of the second winding wire 71B, and is short-circuited to the end portion 81C. An end portion 82B is the other end of the first winding wire 72A. The end portion 82B is electrically connected to an end portion 82C that is one end of the second winding wire 72B, and is short-circuited to the end portion 82C. An end portion 83B is the other end of the first winding wire 73A. The end portion 83B is electrically connected to an end portion 83C that is one end of the second winding wire 73B, and is short-circuited to the end portion 83C. An end portion 81D is the other end of the second winding wire 71B. An end portion 82D is the other end of the second winding wire 72B. An end portion 83D is the other end of the second winding wire 73B. The end portion 81D, the end portion 82D, and the end portion 83D are electrically connected to the short-circuit portion 90, and are short-circuited to each other via the short-circuit portion 90.

Configuration of Switching Apparatus

The switching apparatus 10 is an apparatus for switching the connection state of the coil 42. The switching apparatus 10 includes a switching unit 20 and a control unit 30.

The control unit 30 is a device for controlling the switching unit 20. The control unit 30 may be an electric control apparatus such as an onboard ECU, or may be an information processing apparatus that includes an MPU (Micro-Processing Unit) or the like. The control unit 30 performs on/off control of the switches that constitute the switching unit 20. Specifically, the control unit 30 can output an on signal and an off signal to the switches 21A, 21B, 21C, 22A, 22B, and 22C.

The switching unit 20 is a device for switching the connection states of the winding wires 71, 72, and 73 of the plurality of phases. The switching unit 20 includes a first switching unit 21 and a second switching unit 22. The first switching unit 21 is switched between a first short-circuit state and a first canceled state. The second switching unit 22 is switched between a second short-circuit state and a second canceled state.

The first switching unit 21 includes the switches 21A, 21B, and 21C. Each of the switches 21A, 21B, and 21C may be constituted by at least one semiconductor switch element (for example, an FET (Field Effect Transistor) or an IGBT), or may be constituted by at least one mechanical relay.

The first short-circuit state is a state where all of the switches 21A, 21B, and 21C are on. When the switch 21A is in an on state, a current may flow through the switch 21A in the two directions. When the switch 21B is in an on state, a current may flow through the switch 21B in the two directions. When the switch 21C is in an on state, a current may flow through the switch 21C in the two directions. That is to say, the first short-circuit state is a state where the end portion 81A that is the one end of the first U-phase winding wire 71A and the conductive path 61A (first conductive path) are short-circuited to each other, the end portion 82A that is the one end of the first V-phase winding wire 72A and the conductive path 62A (second conductive path) are short-circuited to each other, and the end portion 83A that is the one end of the first W-phase winding wire 73A and the conductive path 63A (third conductive path) are short-circuited to each other.

The first canceled state is a state where all of the switches 21A, 21B, and 21C are off. When the switch 21A is in an off state, a current being carried through the switch 21A in the two directions is shut off. When the switch 21B is in an off state, a current being carried through the switch 21B in the two directions is shut off. When the switch 21C is in an off state, a current being carried through the switch 21C in the two directions is shut off. That is to say, the first canceled state is a state where short-circuiting between the end portion 81A and the conductive path 61A is canceled, short-circuiting between the end portion 82A and the conductive path 62A is canceled, and short-circuiting between the end portion 83A and the conductive path 63A is canceled. In the first canceled state, no current flows between the conductive path 61A and the conductive path 61B, no current flows between the conductive path 62A and the conductive path 62B, and no current flows between the conductive path 63A and the conductive path 63B. In the first canceled state, a driving current is not supplied to the first winding wires 71A, 72A, and 73A.

The second switching unit 22 includes switches 22A, 22B, and 22C. Each of the switches 22A, 22B, and 22C may be constituted by at least one semiconductor switch element (for example, an FET or an IGBT), or may be constituted by at least one mechanical relay.

The second short-circuit state is a state where all of the switches 22A, 22B, and 22C are on. When the switch 22A is in an on state, a current may flow through the switch 22A in the two directions. When the switch 22B is in an on state, a current may flow through the switch 22B in the two directions. When the switch 22C is in an on state, a current may flow through the switch 22C in the two directions. That is to say, the second short-circuit state is a state where the end portion 81C and the conductive path 61A are short-circuited to each other, the end portion 82C and the conductive path 62A are short-circuited to each other, and the end portion 83C and the conductive path 63A are short-circuited to each other.

The second canceled state is a state where all of the switches 22A, 22B, and 22C are off. When the switch 22A is in an off state, a current being carried through the switch 22A in the two directions is shut off. When the switch 22B is in an off state, a current being carried through the switch 22B in the two directions is shut off. When the switch 22C is in an off state, a current being carried through the switch 22C in the two directions is shut off. That is to say, the second canceled state is a state where short-circuiting between the end portion 81C and the conductive path 61A is canceled, short-circuiting between the end portion 82C and the conductive path 62A is canceled, and short-circuiting between the end portion 83C and the conductive path 63A is canceled.

Operations of Switching Apparatus

The switching unit 20 switches the coil 42 to a first energized state, a second energized state, or a non-energized state. The first energized state is a state where all of the first winding wires 71A, 72A, and 73A and the second winding wires 71B, 72B, and 73B of the coil 42 are energized. The second energized state is a state where only the first winding wires 71A, 72A, and 73A of the first winding wires 71A, 72A, and 73A and the second winding wires 71B, 72B, and 73B are energized. The non-energized state is a state where none of the first winding wires 71A, 72A, and 73A and the second winding wires 71B, 72B, and 73B is energized.

The switching unit 20 is switched to a first switching state, a second switching state, or a third switching state. When the switching unit 20 is switched to the first switching state, the coil 42 is switched to the first energized state. When the switching unit 20 is switched to the second switching state, the coil 42 is switched to the second energized state. When the switching unit 20 is switched to the third switching state, the coil 42 is switched to the non-energized state.

The control unit 30 controls the switching unit 20 to switch the switching unit 20 to one of the first switching state, the second switching state, and the third switching state.

Figure 4:
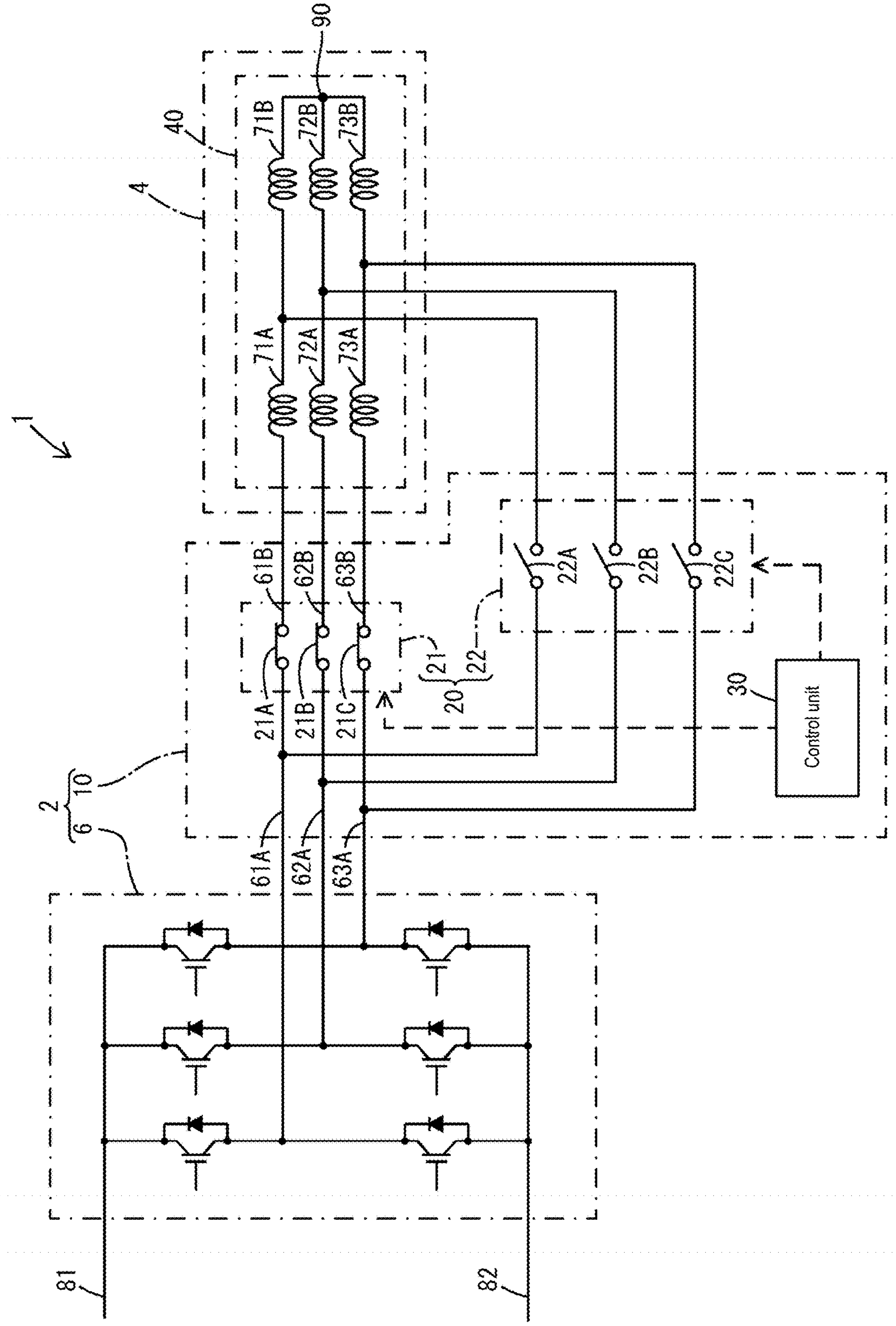
FIG. 4 is an explanatory diagram that depicts a first switching state of the switching apparatus of the AC electric motor shown in FIG. 2.

As shown in FIG. 3, the first switching state is a state where the first switching unit 21 is switched to a short-circuit state (the first short-circuit state), and the second switching unit 22 is switched to a canceled state (the second canceled state). In the first switching state, winding wires to be energized are the first winding wires 71A, 72A, and 73A and the second winding wires 71B, 72B, and 73B. That is to say, the first switching state is a state where energizing control is permitted for all of the first winding wires 71A, 72A, and 73A and the second winding wires 71B, 72B, and 73B of the winding wires 71, 72, and 73 of the plurality of phases. As shown in FIG. 4, in the first switching state, the switches 21A, 21B, and 21C are switched to the on state, the switches 22A, 22B, and 22C are switched to the off state, and the short-circuit portion 90 becomes a neutral point. Therefore, the entirety of the first winding wire 71A and the second winding wire 71B connected in series functions as a U-phase winding wire, through which a driving current flows, the entirety of the first winding wire 72A and the second winding wire 72B connected in series functions as a V-phase winding wire, through which a driving current flows, and the entirety of the first winding wire 73A and the second winding wire 73B connected in series functions as a W-phase winding wire, through which a driving current flows.

Figure 5:
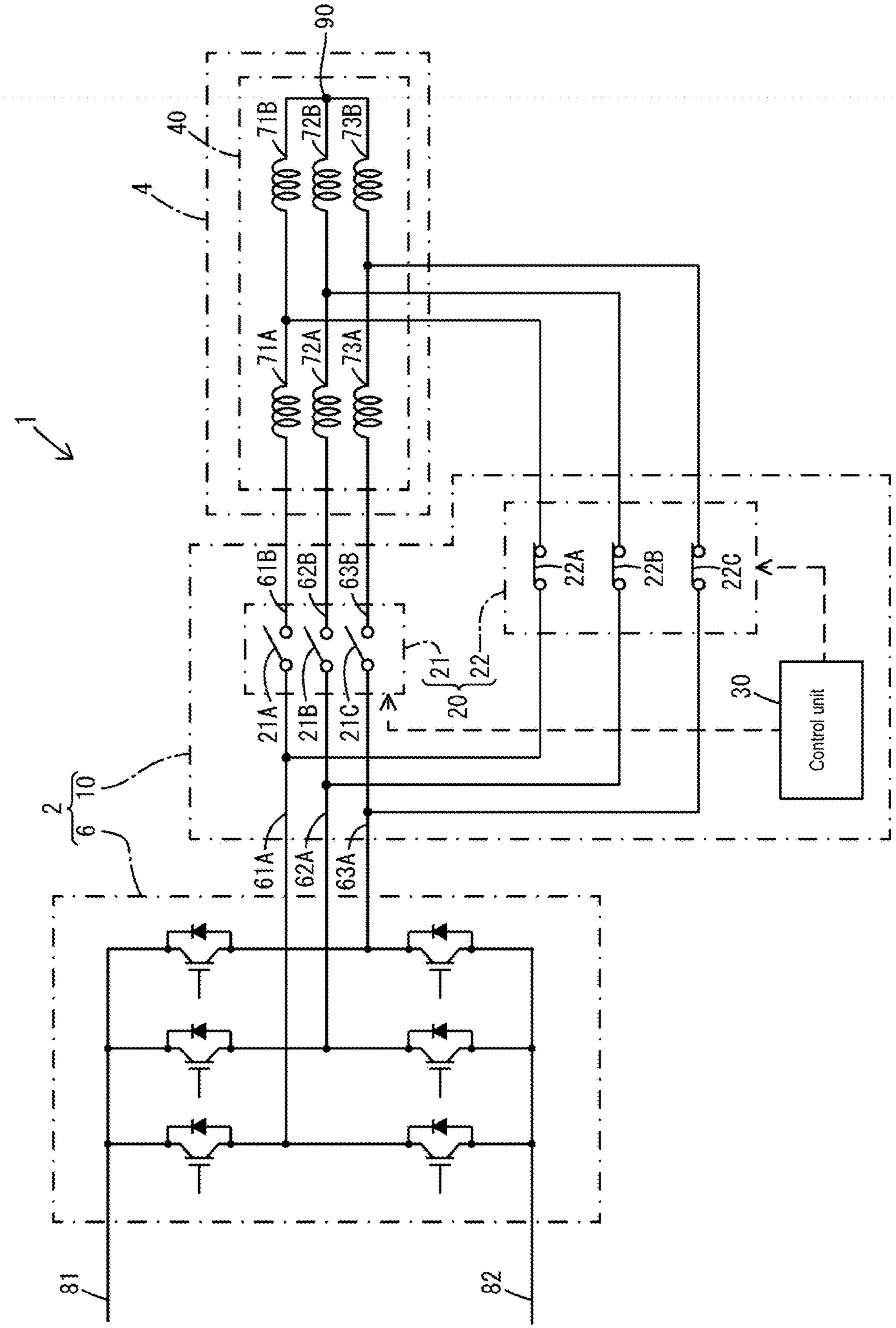
FIG. 5 is an explanatory diagram that depicts a second switching state of the switching apparatus of the AC electric motor shown in FIG. 2.

As shown in FIG. 3, the second switching state is a state where the first switching unit 21 is switched to a canceled state (the first canceled state), and the second switching unit 22 is switched to a short-circuit state (the second short-circuit state). In the second switching state, winding wires to be energized are the second winding wires 71B, 72B, and 73B. That is to say, the second switching state is a state where energizing control is permitted for the second winding wires 71B, 72B, and 73B of the winding wires 71, 72, and 73 of the plurality of phases, and energizing control for the first winding wires 71A, 72A, and 73A is shut off. As shown in FIG. 5, in the second switching state, the switches 22A, 22B, and 22C are switched to the on state, the switches 21A, 21B, and 21C are switched to the off state, and the short-circuit portion 90 becomes a neutral point. Therefore, a driving current flows through the second winding wires 71B, 72B, and 73B, and no driving current flows through the first winding wires 71A, 72A, and 73A.

As shown in FIG. 3, the third switching state is a state where the first switching unit 21 is switched to the canceled state (the first canceled state) and the second switching unit 22 is switched to the canceled state (the second canceled state). In the third switching state, a driving current does not flow through any of the first winding wires 71A, 72A, and 73A and the second winding wires 71B, 72B, and 73B.

The control unit 30 performs control so as to switch the switching unit 20 to one of the aforementioned states. When a first condition is met, the control unit 30 switches the switching unit 20 to the first switching state by switching the first switching unit 21 to the first short-circuit state and switching the second switching unit 22 to the second canceled state. In this case, the onboard system 1 can supply power to both the first winding wires 71A, 72A, and 73A and the second winding wires 71B, 72B, and 73B and use these winding wires with respect to the respective phases. When a second condition that is different from the first condition is met, the control unit 30 switches the switching unit 20 to the second switching state by switching the first switching unit 21 to the first canceled state and switching the second switching unit 22 to the second short-circuit state. In this case, the onboard system 1 can selectively supply power only to the second winding wires 71B, 72B, and 73B and uses the winding wires with respect to the respective phases. In addition, when a third condition that is different from the first and second conditions is met, the control unit 30 switches the switching unit 20 to the third switching state by switching the first switching unit 21 to the first canceled state and switching the second switching unit 22 to the second canceled state. In this case, the onboard system 1 can stop power supply to the first winding wires 71A, 72A, and 73A and the second winding wires 71B, 72B, and 73B with respect to the respective phases. It suffices for the first condition, the second condition, and the third condition to be different from each other.

Configurations of First Winding Wires and Second Winding Wires

In this manner, the connection states of the first winding wires 71A, 72A, and 73A and the second winding wires 71B, 72B, and 73B of the coil 42 of the stator 40 are switched. Configurations of the first winding wires 71A, 72A, and 73A and the second winding wires 71B, 72B, and 73B will be described with reference to FIG. 6. Note that, in FIG. 6 and the following description, the first winding wires 71A, 72A, and 73A are also referred to as "first winding wires 74A", and the second winding wires 71B, 72B, and 73B are also referred to as "second winding wires 74B".

The first winding wires 74A each include a first insertion portion 75A that passes through a slot 55. The second winding wires 74B each include a second insertion portion 75B that passes through the slot 55 through which the first insertion portion 75A passes. The first insertion portion 75A and the second insertion portion 75B are inserted into the slot 55 in the axial direction. The first insertion portion 75A and the second insertion portion 75B are rectangular wires, and cross sections of the first insertion portion 75A and the second insertion portion 75B when cut in a plane direction orthogonal to the extending direction (axial direction) of the first insertion portion 75A and the second insertion portion 75B are rectangular. Both the first insertion portion 75A and the second insertion portion 75B are disposed in the same slot 55. A plurality of first insertion portions 75A and a plurality of second insertion portions 75B are disposed in the same slot 55. The first insertion portions 75A and the second insertion portions 75B are aligned along the radial direction. The first insertion portions 75A and the second insertion portions 75B are alternatingly aligned. The outer periphery of the first insertion portions 75A and the second insertion portions 75B disposed in the same slot 55 is surrounded by the insulative member 43, and is insulated from the stator core 41.

Each first insertion portion 75A includes a first core wire 76A and a first coating portion 77A that covers the first core wire 76A. The first core wire 76A is electrically conductive. The first core wire 76A is made of copper or a copper alloy, for example. A cross section of the first core wire 76A when cut in a direction orthogonal to the extending direction of the first core wire 76A is rectangular. The first coating portion 77A is insulative.

Each second insertion portion 75B includes a second core wire 76B and a second coating portion 77B that covers the second core wire 76B. The second core wire 76B is electrically conductive. The second core wire 76B is made of copper or a copper alloy, for example. The shape of a cross section of the second core wire 76B when cut in a direction orthogonal to the extending direction of the second core wire 76B is rectangular. The second coating portion 77B is insulative.

The electrical resistivity of the first core wire 76A is the same as the electrical resistivity of the second core wire 76B. The first core wire 76A is made of the same material as that of the second core wire 76B. A second cross-section area of the second core wire 76B when cut in a plane direction orthogonal to the extending direction of the second core wire 76B is larger than a first cross-section area of the first core wire 76A when cut in a plane direction orthogonal to the extending direction of the first core wire 76A.

The width of the first core wire 76A in the aligning direction of the first insertion portion 75A and the second insertion portion 75B is denoted by WA1, and the width of the second core wire 76B (in that direction) is denoted by WB1. The width of the first core wire 76A in a direction that is orthogonal to the aligning direction of the first insertion portion 75A and the second insertion portion 75B, and is orthogonal to the extending direction of the first insertion portion 75A and the second insertion portion 75B is denoted by WA2, and the width of the second core wire 76B (in that direction) is denoted by WB2. In this case, WA2 is larger than WA1. In addition, WB2 is larger than WB1. WB1 is larger than WA1. WB2 is larger than WA2.

The heat conductivity of the first coating portion 77A is the same as the heat conductivity of the second coating portion 77B. The electric permittivity of the first coating portion 77A is the same as the electric permittivity of the second coating portion 77B. The first coating portion 77A is made of the same material as that of the second coating portion 77B. The first coating portion 77A and the second coating portion 77B include a resin matrix and air bubbles dispersed in the resin matrix, for example. The resin matrix contains polyimide and polyether sulfone, for example. A thickness D2 of the second coating portion 77B is smaller than the thickness D1 of the first coating portion 77A.

Examples of Effects

As described above, regarding the stator 40, the thickness D2 of the second coating portion 77B is smaller than the thickness D1 of the first coating portion 77A, and thus it is easy to suppress power loss on the second coating portion 77B and an amount of heat that is generated on the second coating portion 77B, and to reduce power loss on the second winding wire 74B and an amount of heat that is generated on the second winding wire 74B. As in the present embodiment, for example, simply by the first coating portion 77A and the second coating portion 77B having at least one of the same heat conductivity and the same material, power loss and an amount of heat generated on the second coating portion 77B can be made lower than power loss and an amount of heat generated on the first coating portion 77A when the same power is supplied to the first core wire 76A and the second core wire 76B.

Furthermore, regarding the stator 40, the first insertion portions 75A and the second insertion portions 75B are alternatingly aligned in the same slot 55. Therefore, according to the stator 40, even when the thickness D2 of the second coating portion 77B is small, the thickness D1 of the first coating portion 77A that is adjacent to the second coating portion 77B is large, and thus it is easy to ensure insulation between the first core wire 76A and the second core wire 76B while suppressing the thickness D2 of the second coating portion 77B.

Furthermore, regarding the stator 40, the second cross-section area of the second core wire 76B is larger than the first cross-section area of the first core wire 76A. For this reason, it is easy to reduce the electrical resistivity of the second core wire 76B, and to reduce power loss (so called copper loss) and heat generation on the second core wire 76B. As in the present embodiment, for example, simply by the first core wire 76A and the second core wire 76B having at least one of the same electrical resistivity and the same material, the electrical resistivity of the second core wire 76B becomes lower (than that of the first core wire 76A), and power loss (so-called copper loss) and heat generation on the second core wire 76B become lower (than those of the first core wire 76A). Moreover, regarding the stator 40, the thickness D2 of the second coating portion 77B is smaller than the thickness D1 of the first coating portion 77A, and thus, it is possible to suppress an increase in the thickness of the second insertion portion 75B while keeping the second core wire 76B thick.

Furthermore, the coil 42 is switched between the first energized state where all of the first winding wires 74A and the second winding wires 74B are energized, and the second energized state where only the second winding wires 74B are energized. Therefore, it is easy to reduce power loss and an amount of heat generated on the coil 42 of the stator 40 in the second energized state, and thus it is easy to reduce total power loss and a total amount of heat generated on the coil 42 in the first energized state and the second energized state. As in the present embodiment, for example, simply by the first coating portion 77A and the second coating portion 77B having at least one of the same heat conductivity and the same material, it is possible to reduce power loss and an amount of heat generated on the coil 42 in the second energized state, without increasing power loss and an amount of heat generated on the coil 42 in the first energized state, compared with a configuration in which the thicknesses of the coating portions of the first winding wire 74A and the second winding wire 74B are the same. For this reason, it is possible to reduce total power loss and a total amount of heat generated on the coil 42 in the first energized state and the second energized state.

Other Embodiments

The present disclosure is not limited to the embodiments described above with reference to the drawings. Any combination of characteristics in the embodiments described above and below can be made as long as no contradictions arise. In addition, any characteristics in the embodiment described above and below can be omitted unless explicitly stated as being essential. Furthermore, the above embodiments may be changed as follows.

In the above embodiments, the switching apparatus 10 includes the control unit 30, but the switching apparatus does not need to include the control unit 30. A configuration may be adopted in which, for example, a switching apparatus is constituted only by the above switching unit 20, and this switching apparatus (specifically, the switching unit 20) receives an instruction from an external apparatus (for example, an apparatus that has functions similar to those of the above control unit 30), and performs a switching operation.

In the above embodiments, the winding wires are divided into two with respect to each phase, but the winding wires may be separated into three or more with respect to each phase.

Note that the embodiments disclosed herein are to be considered as illustrative and non-limiting in all aspects. The scope of the present disclosure is not limited by the embodiments disclosed herein, and all changes that come within the range indicated by the claims or the range of equivalency of the claims are intended to be embraced therein.

The invention claimed is:

1. A stator comprising:

a stator core; and a coil, wherein a connection state of the coil is switched, the stator core includes a plurality of slots and a plurality of tooth portions that are annularly aligned in an alternating manner, the coil includes winding wires of a plurality of phases, including at least a first winding wire and a second winding wire that are wound around the tooth portions, connection states of the first winding wire and the second winding wire being switched, the first winding wire includes a plurality of first insertion portions that passes through a slot, the second winding wire includes a plurality of second insertion portions that passes through the slot through which the first insertion portion passes, both the plurality of first insertion portions and the plurality of second insertion portions are disposed in the same slot, each of the plurality of first insertion portions include a first core wire and a first coating portion that covers the first core wire, each of the plurality of second insertion portions include a second core wire and a second coating portion that covers the second core wire, and a thickness of the second coating portion is smaller than a thickness of the first coating portion and wherein the plurality of first insertion portions and the plurality of second insertion portions are alternatingly aligned in a radial direction in the slot.

2. The stator according to claim 1, wherein a second cross-section area of the second core wire when cut in a plane direction orthogonal to an extending direction of the second core wire is larger than a first cross-section area of the first core wire when cut in a plane direction orthogonal to an extending direction of the first core wire.

3. The stator according to claim 1, wherein the coil is switched between a first energized state where both the first winding wire and the second winding wire are energized and a second energized state where only the second winding wire is energized.

* * * * *